(12) United States Patent
Sahi et al.

(10) Patent No.: US 11,630,817 B2
(45) Date of Patent: Apr. 18, 2023

(54) METHOD AND SYSTEM FOR DATA INDEXING AND REPORTING

(71) Applicant: YAHOO ASSETS LLC, Dulles, VA (US)

(72) Inventors: Attila Sahi, San Jose, CA (US); Venkat Gandikota Raju, San Jose, CA (US)

(73) Assignee: YAHOO ASSETS LLC, New York, NY (US)

( * ) Notice: Subject to any disclaimer, the term of this patent is extended or adjusted under 35 U.S.C. 154(b) by 136 days.

(21) Appl. No.: 16/235,295

(22) Filed: Dec. 28, 2018

(65) Prior Publication Data
US 2020/0210397 A1 Jul. 2, 2020

(51) Int. Cl.
G06F 16/22 (2019.01)
G06F 16/2455 (2019.01)
G06F 16/248 (2019.01)

(52) U.S. Cl.
CPC ........ G06F 16/2237 (2019.01); G06F 16/248 (2019.01); G06F 16/24568 (2019.01)

(58) Field of Classification Search
CPC ........... G06F 16/2237; G06F 16/24568; G06F 16/248
USPC ........................................................ 707/722
See application file for complete search history.

(56) References Cited

U.S. PATENT DOCUMENTS

| | | | | |
|---|---|---|---|---|
| 9,501,542 B1* | 11/2016 | Natanzon | ............ | G06F 11/2074 |
| 2007/0005631 A1* | 1/2007 | Barsness | ............ | G06F 16/2272 |
| | | | | 707/999.102 |
| 2012/0002895 A1* | 1/2012 | Blum | ................... | G06F 16/2237 |
| | | | | 382/251 |
| 2013/0166960 A1* | 6/2013 | Das | ..................... | H04L 43/0847 |
| | | | | 714/47.1 |
| 2013/0202219 A1* | 8/2013 | Hiromoto | ............ | H04N 19/176 |
| | | | | 382/251 |
| 2013/0262488 A1* | 10/2013 | Shirakawa | .............. | G06F 16/10 |
| | | | | 707/756 |
| 2014/0358945 A1* | 12/2014 | Xie | ........................ | G06F 16/907 |
| | | | | 707/758 |
| 2018/0121129 A1* | 5/2018 | Sawhney | .............. | G06F 3/0604 |

(Continued)

OTHER PUBLICATIONS

Paul Murrell, 5.3 Binary formats, Oct. 17, 2008, Creative Commons, https://web.archive.org/web/20081017153818/https://www.stat.auckland.ac.nz/~paul/ltDT/HTML/node39.html (Year: 2008).*

Primary Examiner — Allen S Lin
(74) Attorney, Agent, or Firm — Venable LLP

(57) ABSTRACT

The present teaching relates to system, method, and programming for indexing user records. A plurality of user records are obtained, wherein each user record is associated with a user identifier and one or more data-segments. For each data-segment, one or more user identifiers associated with the data-segment are determined, a relative distance of each user identifier with respect to a previous user identifier associated with the data-segment is computed, and a variable number of bits to be used to store the relative distance of each user identifier in a bit stream are determined based on a criterion associated with the relative distance. Offset values are generated for the one or more data-segments, wherein an offset value of a data-segment indicates an index of the bit stream where information of a first user identifier associated with the data-segment is stored.

20 Claims, 16 Drawing Sheets

(56) References Cited

U.S. PATENT DOCUMENTS

2019/0295725 A1* 9/2019 Morrow, Jr. ............ G16H 50/30
2019/0385243 A1* 12/2019 Childers ............. G06F 16/5854

* cited by examiner

| Value Range | Encoding Method | Sample Data (Decimal → Bits) |
|---|---|---|
| 0 - 127 | Value +128 in single byte | 17 → 10010001 |
| 128 - 16383 | Value +32768 in two byte | 1025 → 01000100 00000001 |
| 16384 - 4194303 | Same value in three byte | 65537 → 00000001 00000000 00000001 |

| Segment | First User ID | Relative Distance of Additional User IDs |
|---|---|---|
| 10 | 00000000 00000000 00000000 | 10000001, 11100011, 10000001, 11100011 |
| 2000 | 00000000 00000000 00000000 | 01000001 11001000, 01100110 01001000, 00000001 00111000 10000000 |
| 30000 | 00000000 00000000 01100100 | - |

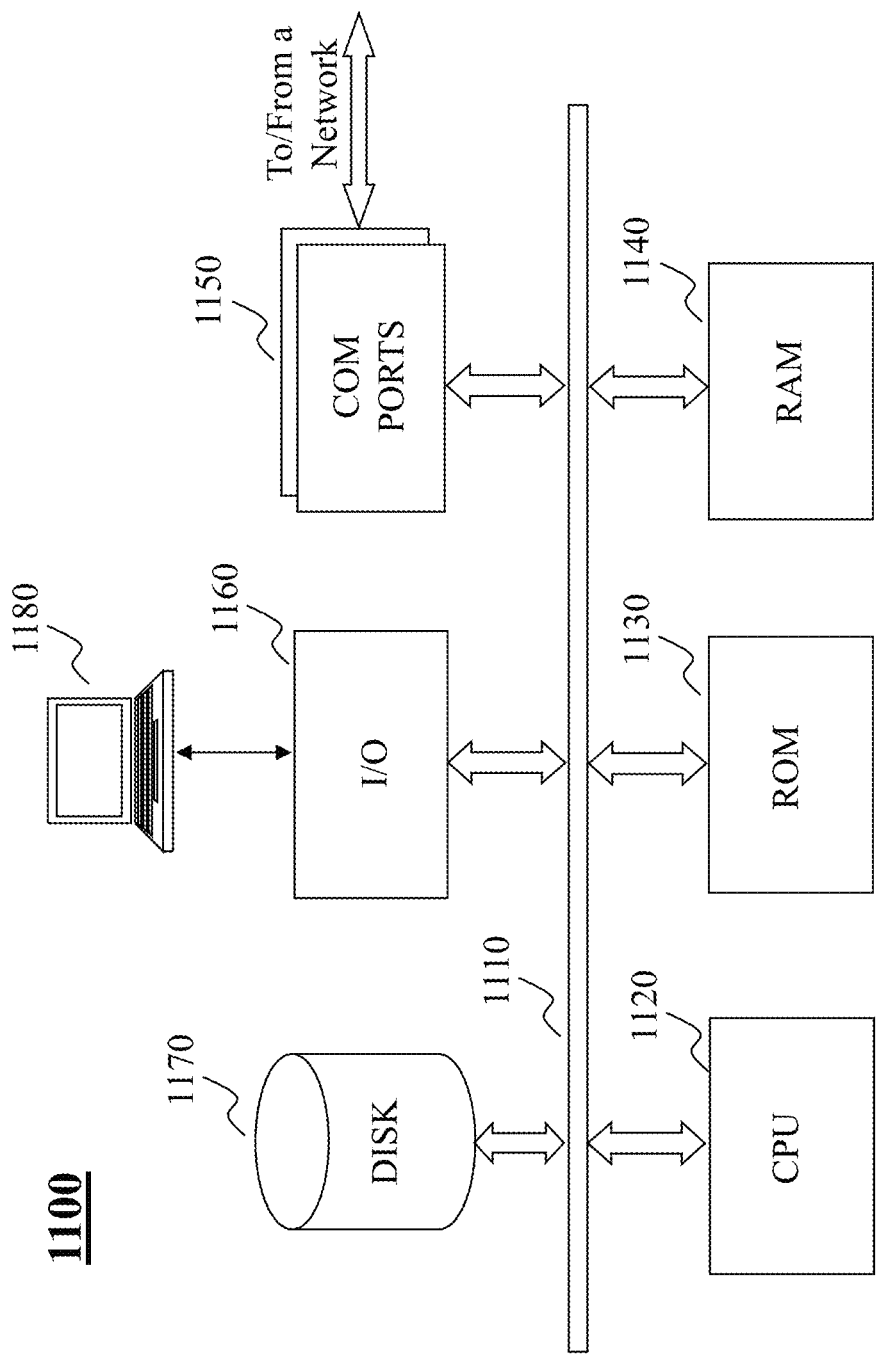

METHOD AND SYSTEM FOR DATA INDEXING AND REPORTING

BACKGROUND

1. Technical Field

The present teaching generally relates to data processing. More specifically, the present teaching relates to techniques of processing and indexing Big Data.

2. Technical Background

In the age of the Internet, amount of data available becomes explosive. Great effort has been made to analyze the vast amount of data to make some sense out of it in order to improve the efficiency associated with data access. With considerable advances in computing and storage technologies, advancements in cloud computing, development of ubiquitous connectivity, and the Internet of Things, there has been an explosion in the size and variety of collected data. Nevertheless, one can be data-rich and knowledge-poor, and this is where data analytics and the development and application of machine learning models becomes a necessity for gaining insights of complex processes to support decision making and enhance strategic planning in different areas of economy, finance, industry, healthcare, etc.

Recently, there has also been an influx of polymorphic, unstructured and multimodal data—social media, images, audio, video, etc., which is complicating further the data processing and knowledge extraction process. In scenarios where generating real-time reports is required, the existing data analytics systems cannot process such data as they heavily rely on pre-aggregated data rather than raw data. Specifically, traditional analytics systems are designed to work with data that has been pre-processed based on a set of predetermined rules. As such, the traditional analytics systems are adapted to provide responses to queries of only a certain type. Moreover, the traditional analytics systems are not designed to handle ad-hoc complex targeting rules and generate real-time reports based on high-dimensional data in a fast and efficient manner.

Thus, there is a need for methods and systems that address the above stated limitations.

SUMMARY

The teachings disclosed herein relate to methods, systems, and programming for processing and indexing Big data.

One aspect of the present disclosure provides for a method implemented on a machine having at least one processor, storage, and a communication platform capable of connecting to a network for indexing user records. The method includes the steps of obtaining a plurality of user records, wherein each user record is associated with a user identifier and one or more data-segments. For each data-segment, the method includes determining one or more user identifiers associated with the data-segment, computing a relative distance of each user identifier with respect to a previous user identifier associated with the data-segment, and determining, based on a criterion associated with the relative distance, a variable number of bits to be used to store the relative distance of each user identifier in a bit stream. The method includes generating offset values for the one or more data-segments, wherein an offset value of a data-segment indicates an index of the bit stream where information of a first user identifier associated with the data-segment is stored.

By one aspect of the present disclosure, there is provided a system for indexing user records. The system includes a data receiving unit configured for obtaining a plurality of user records, wherein each user record is associated with a user identifier and one or more data-segments, a segment population unit configured for determining, for each data-segment, one or more user identifiers associated with the data-segment, a relative distance computing unit configured for computing, for each data-segment, a relative distance of each user identifier with respect to a previous user identifier associated with the data-segment, a relative distance encoder configured for determining, for each data-segment, a variable number of bits to be used to store the relative distance of each user identifier in a bit stream based on a criterion associated with the relative distance, and a data stream generator configured for generating offset values for the one or more data-segments, wherein an offset value of a data-segment indicates an index of the bit stream where information of a first user identifier associated with the data-segment is stored.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, there is provided, a non-transitory computer readable medium including computer executable instructions, wherein the instructions, when executed by a computer, cause the computer to perform a method for indexing user records. The method includes the steps of obtaining a plurality of user records, wherein each user record is associated with a user identifier and one or more data-segments. For each data-segment, the method includes determining one or more user identifiers associated with the data-segment, computing a relative distance of each user identifier with respect to a previous user identifier associated with the data-segment, and determining, based on a criterion associated with the relative distance, a variable number of bits to be used to store the relative distance of each user identifier in a bit stream. The method includes generating offset values for the one or more data-segments, wherein an offset value of a data-segment indicates an index of the bit stream where information of a first user identifier associated with the data-segment is stored.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 9A-9F illustrate schematics of indexing and storing user records, according to embodiments of the present teaching;

FIG. 11 depicts the architecture of a computer which can be used to implement a specialized system incorporating the present teaching.

DETAILED DESCRIPTION

Figure 1A:
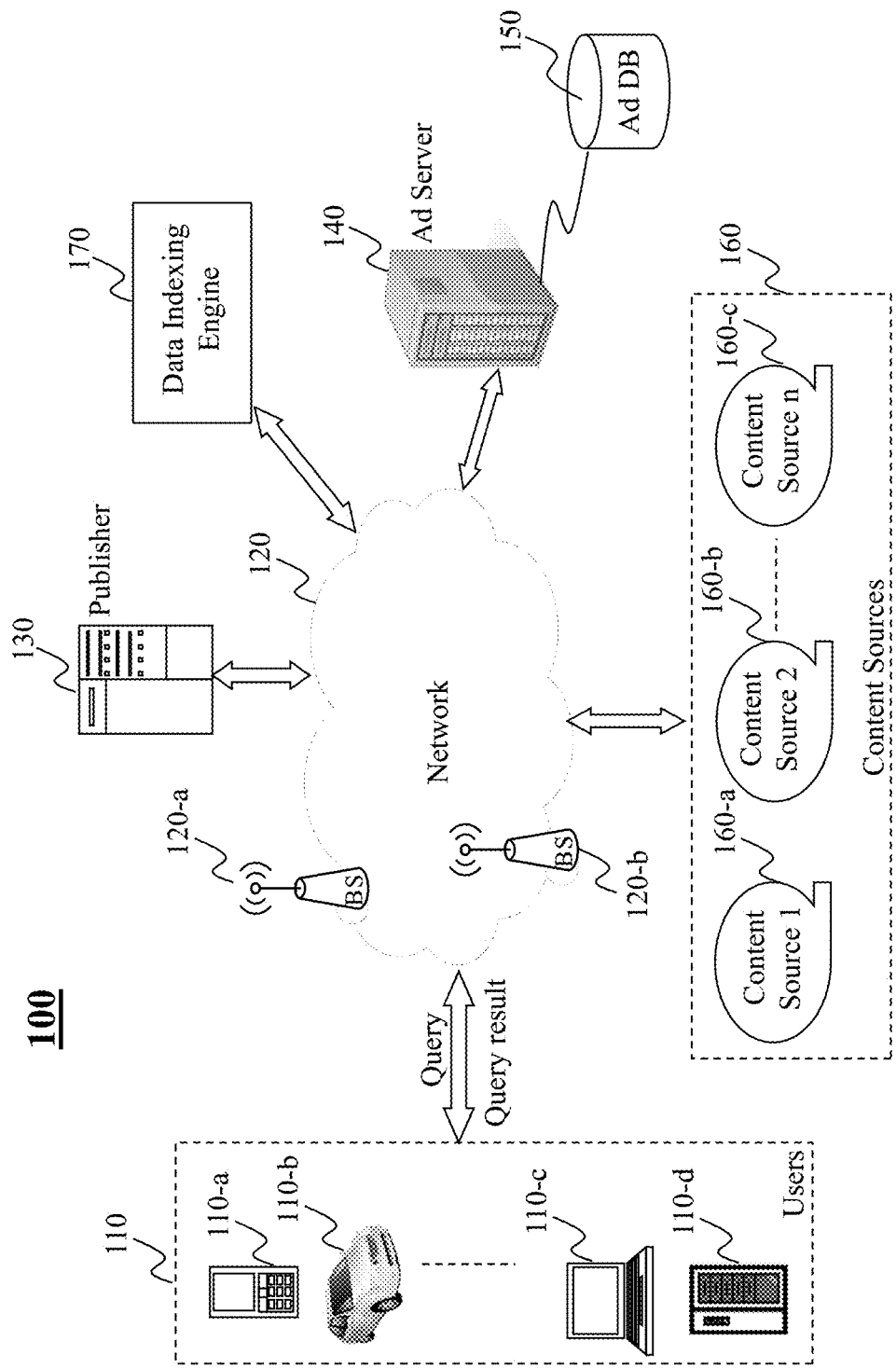
FIGS. 1A-1C depict different operational configurations of a data indexing engine in a network setting, according to different embodiments of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein. Example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1B:
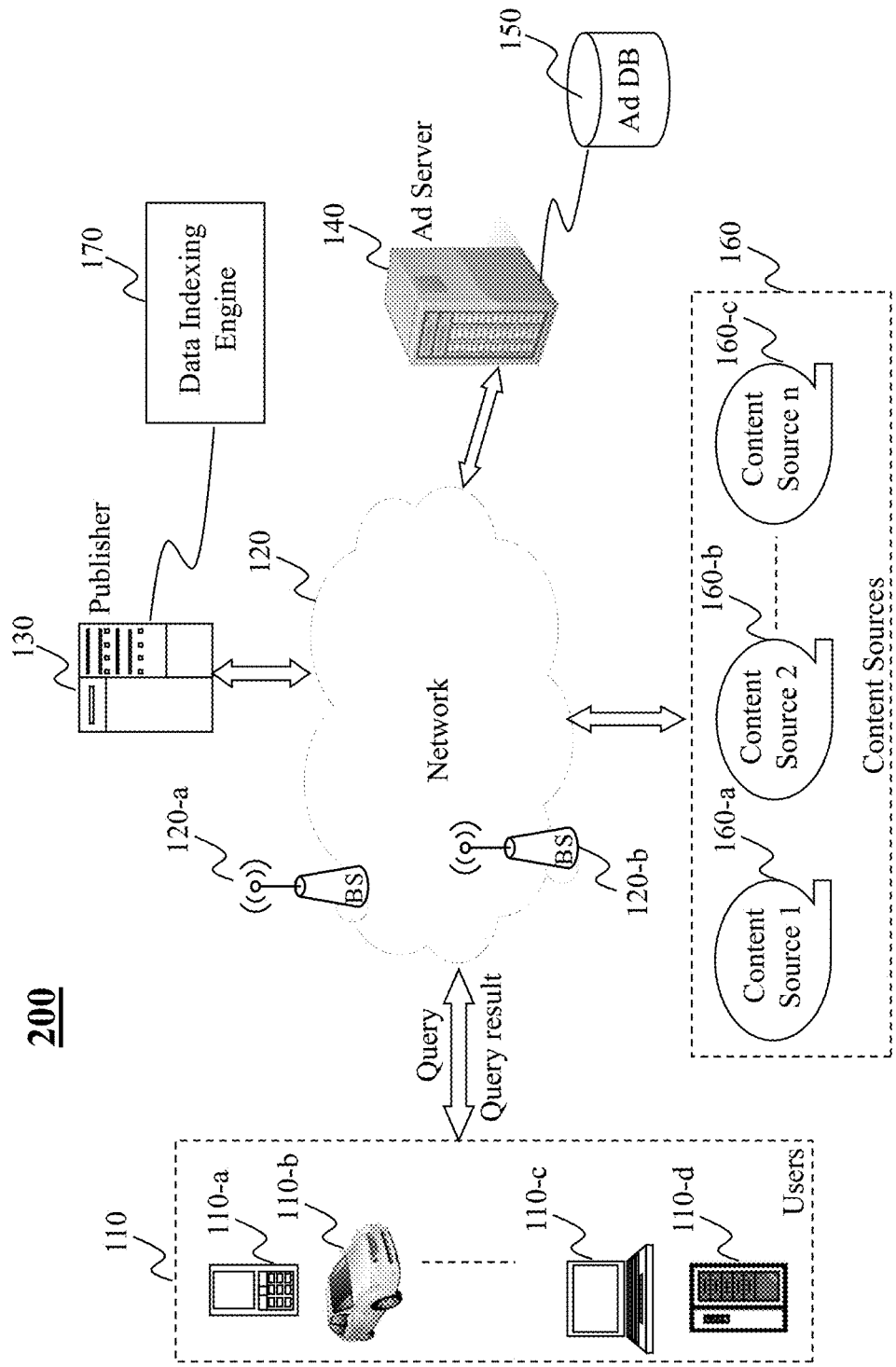
Figure 1C:
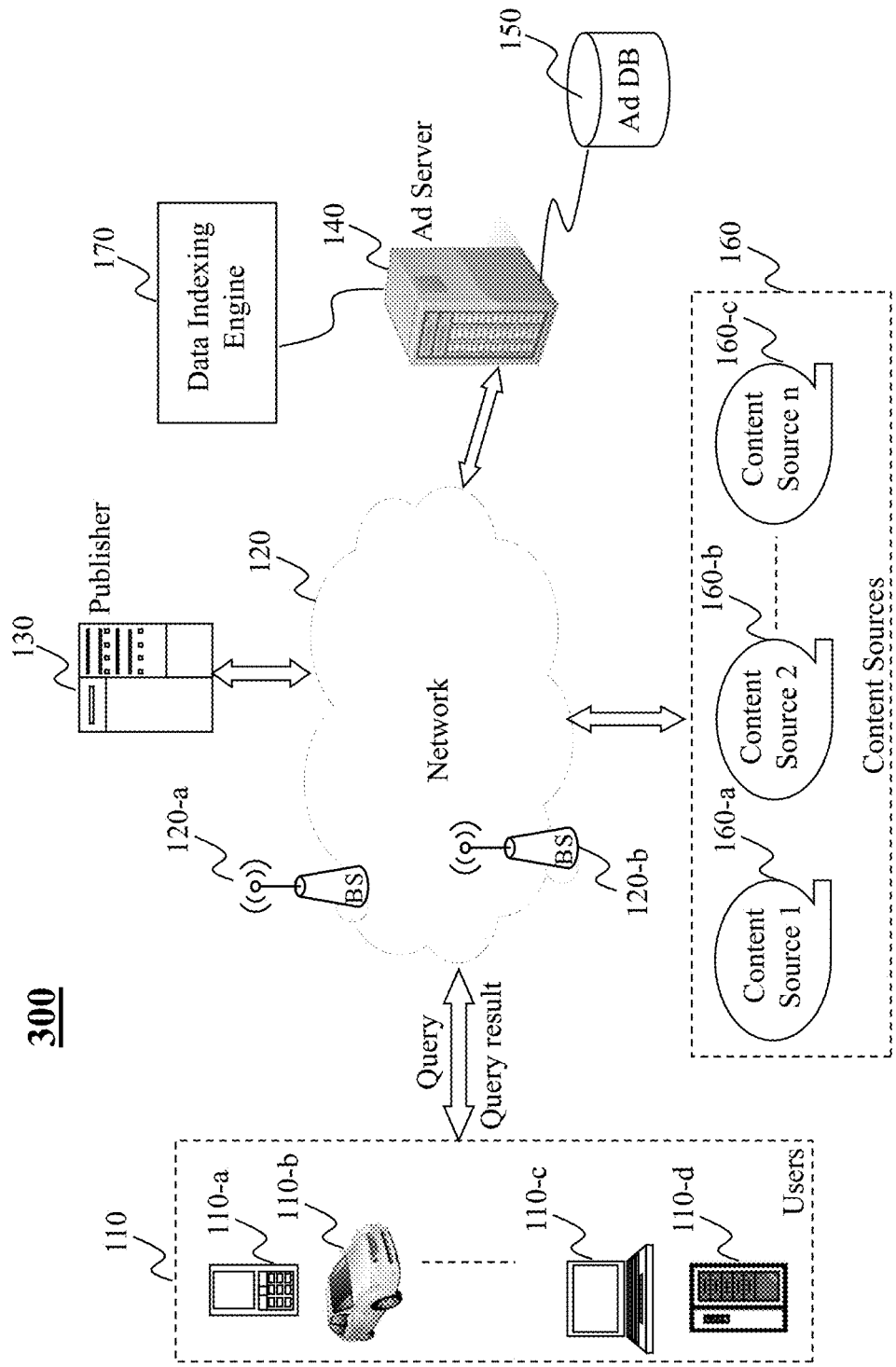

FIGS. 1A-1C depict different operational configurations of a data indexing engine in a network setting, according to different embodiments of the present teaching. In FIG. 1A, an exemplary system configuration 100 includes users 110, a network 120, an exemplary publisher 130, content sources 160 including content source 1 160-*a*, content source 2 160-*b*, . . . , content source n 160-*c*, an advertisement server 140, and a data indexing engine 170. In this illustrated embodiment, the data indexing engine 170 is directly connected to the network 120 and operates as an independent service engine that processes and indexes data.

By one embodiment of the present teaching, data processed by the data indexing engine 170 may relate to user records that each contain several variable length arrays. Each array is referred to herein as a data-segment and may correspond to data related to mail, purchases made by the user, search events related to the user, campaign events, advertisement clicking activities of the user, etc. The data indexing engine 170 may receive a query related to the user records, for instance, from the publisher 130. As discussed herein, the data indexing engine 170 processes the user records and indexes (and stores) data in a specific manner that enables the data indexing engine 170 to generate a response to the query in a fast and efficient manner. For example, the data indexing engine 170 may generate a plurality of reports and provide the reports as response(s) to the query to the publisher 130 via the network 120.

In the embodiment illustrated in FIG. 1A, as the data indexing engine 170 is a stand-alone service, it may provide its services to a plurality of publishers 130 and a plurality of advertisement servers 140 (not shown plurality of each). It must be appreciated that in some applications, the data indexing engine 170 may also be used to issue responses to queries issued by other parties e.g., advertisers, third-party service providers, etc.

In FIG. 1B, an alternative configuration 200 is provided, in which the data indexing engine 170 is connected to a publisher 130 as its backend service engine. That is, in this embodiment, the data indexing engine 170 is a special module in the backend of the publisher 130. When there are multiple publishers (not shown), each may have its own backend module for processing and indexing data and providing responses to queries in real time.

In FIG. 1C, yet another alternative configuration 300 is provided, in which the data indexing engine 170 is connected to an advertisement server 140 as a backend service engine. That is, in this embodiment, the data indexing engine 170 is a special module in the backend of the advertisement server 140. When there are multiple advertisement servers, each may have its own backend module for processing and indexing data and providing responses to queries in real time.

An application of the data indexing engine 170 as depicted in the embodiments illustrated in FIGS. 1B and 1C may be related to processing user records that include advertisement activities of the users. For instance, Ads stored in an advertisement database 150 may be provided (via the Ad server 140) to users on a webpage associated with the publisher 130. The publisher 130 and/or advertisers (or third-party vendors) may be interested in qualifying users based on certain advertisement events or other criteria. In such cases, the publisher 130 and/or advertisers may issue a query to the data indexing engine 170 to obtain responses to their specific queries. Accordingly, the data indexing engine 170 processes the user records and indexes data in a specific manner that enables it to generate the response to the queries in a fast and efficient manner.

In FIGS. 1A-1C, the network 120 may be a single network or a combination of different networks. For example, a network may be a local area network (LAN), a wide area network (WAN), a public network, a private network, a proprietary network, a Public Telephone Switched Network (PSTN), the Internet, a wireless network, a cellular network, a Bluetooth network, a virtual network, or any combination thereof. The network 120 may also include various network access points, e.g., wired or wireless access points such as base stations 120-a, 120-b, or Internet exchange points (not shown) through which a data source may connect to the network 120 in order to transmit/receive information via the network.

In some embodiments, the network 120 may be an online advertising network or an ad network, which connects the data indexing engine 170 to/from the publisher 130 or websites/mobile applications hosted thereon that desire to receive or display advertisements. Functions of an ad network may include an aggregation of ad-space supply from the publisher 130, ad supply from the advertisement server 140, etc. An ad network may be any type of advertising network environments such as a television ad network, a print ad network, an online (Internet) ad network, or a mobile ad network.

The publisher 130 can be a content provider, a search engine, a content portal, or any other sources from which content can be published. The publisher 130 may correspond to an entity, whether an individual, a firm, or an organization, publishing or supplying content, including a blogger, television station, a newspaper issuer, a web page host, a content portal, an online service provider, or a game server. For example, in connection to an online or mobile ad network, publisher 130 may also be an organization such as USPTO.gov and CNN.com, or a content portal such as YouTube and Yahoo.com, or a content-soliciting/feeding source such as Twitter, Facebook, or blogs. In one example, content sent to a user may be generated or formatted by the publisher 130 based on data provided by or retrieved from the content sources 160.

The content sources 160 may correspond to content/app providers, which may include, but not limited to, to an individual, a business entity, or a content collection agency such as Twitter, Facebook, or blogs, that gather different types of content, online or offline, such as news, papers, blogs, social media communications, magazines, whether textual, audio visual such as images or video content. The publisher may also be a content portal presenting content originated by a different entity (either an original content generator or a content distributor). Examples of a content portal include, e.g., Yahoo! Finance, Yahoo! Sports, AOL, and ESPN. The content from content sources 160 include multi-media content or text or any other form of content including website content, social media content from, e.g., Facebook, Twitter, Reddit, etc., or any other content generators. The gathered content may be licensed content from providers such as AP and Reuters. It may also be content crawled and indexed from various sources on the Internet. Content sources 160 provide a vast range of content that are searchable or obtainable by the publisher 130.

Users 110 may be of different types such as ones connected to the network via wired or wireless connections via a device such as a desktop 110-d, a laptop 110-c, a handheld device 110-a, a built-in device embedded in a vehicle such as a motor vehicle 110-b, or wearable devices (e.g., glasses, wrist watch, etc.). In one embodiment, users 110 may be connected to the network 120 to access and interact with online content (provided by the publisher 130), via wired or wireless means, through related operating systems and/or interfaces implemented within the relevant user interfaces.

By one embodiment of the present teaching, in operation, a request for an advertisement from the publisher 130 is received by the advertisement server 140, which may be centralized or distributed. The advertisement server 140 may archive data related to a plurality of advertisements in an advertisement database 150, which may or may not reside in the cloud. The advertisement server 140 operates to distribute advertisements to appropriate ad placement opportunities on different platforms. The advertisements accessible by the advertisement server 140 may include some textual information, e.g., a description of what the advertisement is about as well as additional information such as target audience as well as certain distribution criteria related to, e.g., geographical coverage or timing related requirements. Target audience may be specified in terms of, e.g., demographics of the target audience, the distribution criteria may specify geographical locations of the target audience, and/or time frame(s) the advertisement is to be distributed to the target audience.

When a request is received from the publisher 130 for an advertisement, either the publisher 130 or the advertisement server 140 may invoke the data indexing engine 170 to process data streams (e.g., a data stream including information related to user interaction with online content) and provide responses to queries. In what follows, there is provided a detailed description of the data indexing engine 170 and techniques utilized therein to index data in an efficient manner such that responses to queries can be generated in real-time.

Figure 2:
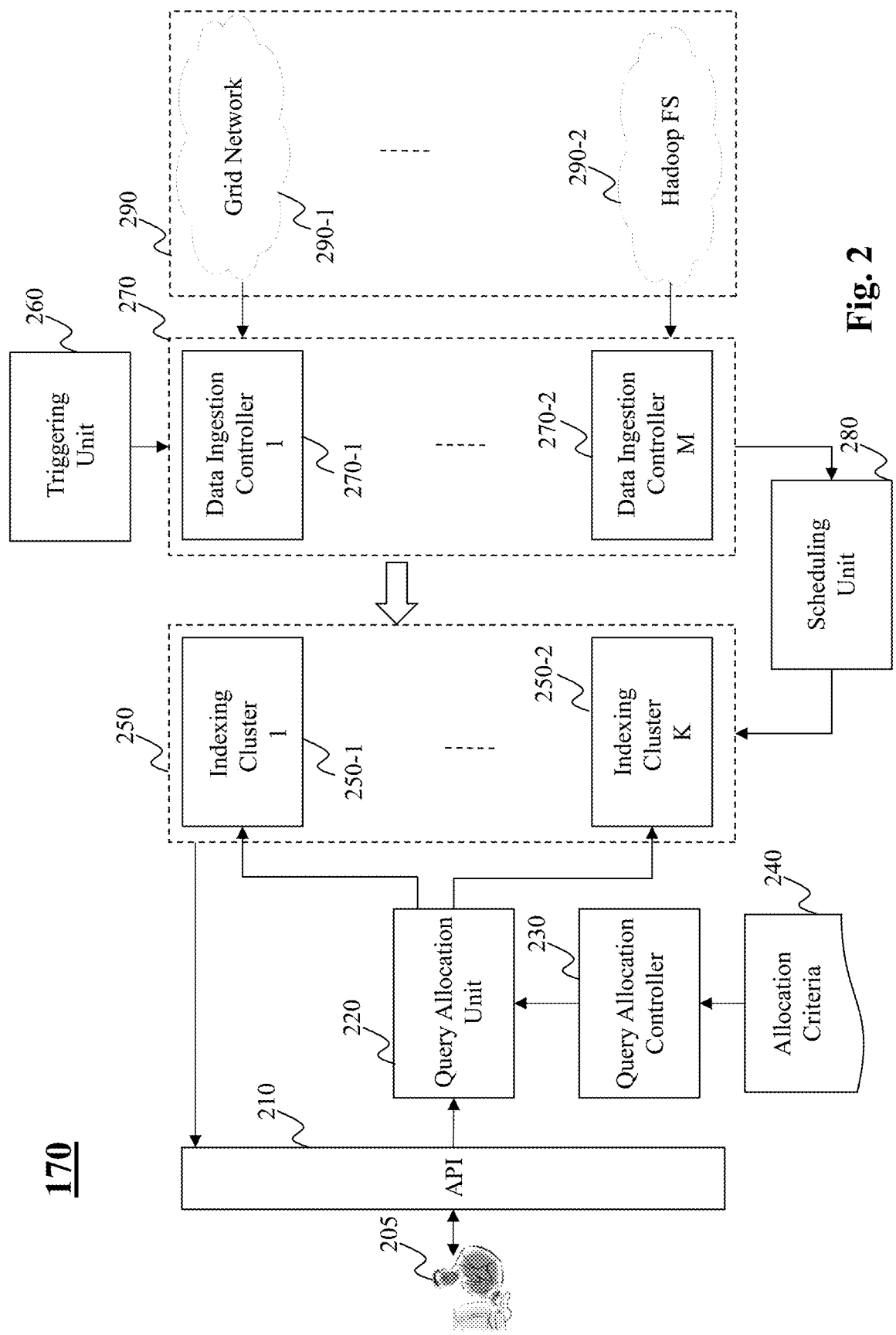
FIG. 2 depicts an exemplary high-level system diagram of a data indexing engine, according to an embodiment of the present teaching.

FIG. 2 depicts an exemplary high-level system diagram of a data indexing engine 170, according to an embodiment of the present teaching. The data indexing engine 170 includes an application interface (API) 210 via which a user 205 communicates with the data indexing engine 170. The data indexing engine 170 also includes a query allocation unit 220, a query allocation controller 230, a plurality of indexing clusters 250 including indexing cluster 1 250-1, . . . , indexing cluster K 250-2, a triggering unit 260, a plurality of data ingestion controllers 270 including data ingestion controller 1 270-1, . . . data ingestion controller M 270-2, a scheduling unit 280, and data networks 290 which include for instance a grid network 290-1, a Hadoop file system 290-2, etc.

According to an embodiment of the present teaching, data related to a user is referred to herein as a user record. Each user record is associated with a unique user-identifier (ID). The contents of a user record may include single attribute data (e.g., age of the user, gender of the user, etc.), as well as several kinds of arrays (each referred to herein as a segment array or data-segment) that include information related to, for instance, user activity such as purchases, clicking activity, impressions, search activity, etc. Such user records are stored in the data networks 290.

The data ingestion controllers 270 retrieve data stored in the data networks 290 and transmit the retrieved data to the indexing clusters 250 for further processing. The data ingestion controllers 270 are programmed to obtain snapshots of the data stored in the data networks 290. For example, the data ingestion controllers 270-1, 270-2 etc., may be configured to obtain a snapshot of the data stored in the grid network 290-1, Hadoop file system 290-2 etc., after expiration of a predetermined amount of time (e.g., 30 minutes, 2 hours, 4 hours, etc.). Alternatively, or in addition to, the data ingestion controllers 270 may be activated by the triggering unit 260 to perform the data retrieval process from the data networks 290. Specifically, the triggering unit 260 may serve as an alternate means (e.g., external third-party triggers) that trigger the data ingestion controllers 270 to retrieve the data from the data networks 290.

Upon retrieving the data from the data networks 290, the scheduling unit 280 schedules the transmission of the retrieved data from the data ingestion controllers 270 to the plurality of indexing clusters 250. By one embodiment of the present teaching, the scheduling unit 280 may schedule data transmission to the indexing clusters 250 based on a scheduling criterion such as at predetermined time-intervals, a scheduling priority based on the type of data, etc. Each indexing cluster 250-1, 250-2 etc., is configured to obtain the data from the data ingestion controllers 270 and further process (and store) the data in a manner such that responses to real-time queries (related to the data) can be generated in a fast and efficient manner e.g., responses to the real-time queries can be generated in order of milli-seconds.

By one embodiment of the present teaching, each indexing cluster 250-1, 250-2 etc., is configured to process and store data in a column-based format. Each column may be stored in a separate binary file. Thus, while processing queries, only relevant data (i.e., binary files) may be loaded and processed to generate the response to the query in a fast manner. It must be appreciated that the column-based storage format as implemented by the indexing clusters 250 provides high performance improvements as compared to traditional row-based storage systems. Details regarding the indexing clusters 250 is provided next with reference to FIGS. 4 and 6.

As stated previously, the user 205 communicates with the data indexing engine 170 via the API 210. A query submitted by the user 205 is received by the query allocation unit 220. The query allocation controller 230 controls the query allocation unit 220 and directs the received query to at least one indexing cluster 250. Specifically, the query allocation controller 230 utilizes allocation criteria 240 to direct the query to at least one of the indexing clusters 250. The allocation criteria may correspond to for instance, a current processing workload of the indexing cluster and the like. The indexing cluster that receives the query utilizes the processed data (i.e., data stored in the column-based format) to generate a response to the query. The generated response is provided by the indexing cluster to the user 205 via the API 210. It must be appreciated that the teachings of the present disclosure are in no way limited to the specific configuration of the data indexing engine 170 as depicted in FIG. 2. For instance, although a single API 210 is depicted in FIG. 2, the data indexing engine 170 may include multiple APIs (e.g., application specific interfaces) via which users may communicate with the data indexing engine 170.

Figure 3:
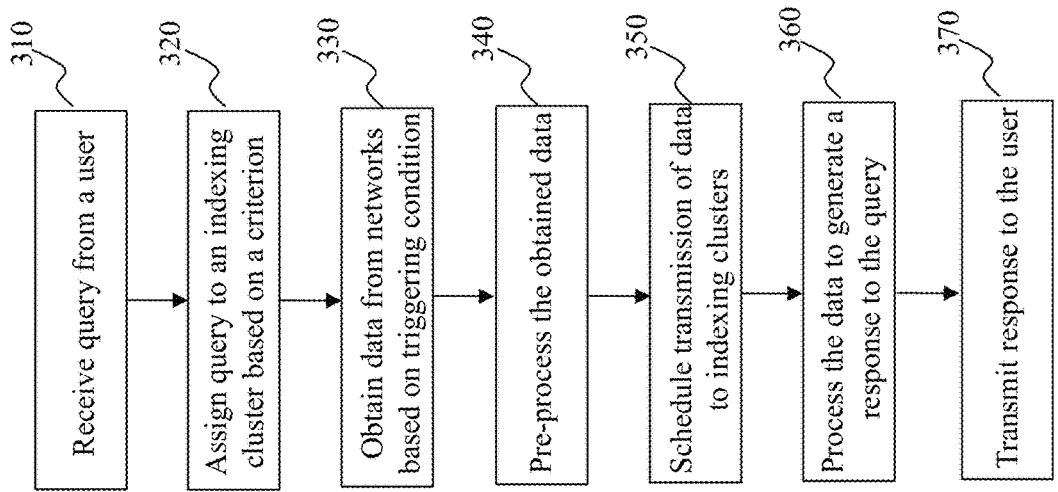
FIG. 3 is a flowchart of an exemplary process of a data indexing engine, according to an embodiment of the present teaching.

FIG. 3 is a flowchart of an exemplary process of a data indexing engine, according to an embodiment of the present teaching. The method commences in step 310 wherein a query is received from a user. In step 320, the received query is assigned to one or more indexing clusters based on a criterion.

In step 330, raw data stored in data networks is obtained via the data ingestion controllers based on triggering conditions. In step 340, the data indexing engine may pre-process the obtained raw data. For example, the data indexing engine may pre-process the obtained raw data to transform the raw data in a format that is suitable for indexing purposes.

The method then proceeds to step 350, wherein the pre-processed data is scheduled for transmission to the indexing clusters. In step 360, the indexing clusters of the data indexing engine process the data i.e., index and store the data in a particular format such that response(s) to the query issued by the user can be generated in an efficient manner. In step 370, the generated response is provided (e.g., via the API) to the user.

Figure 4:
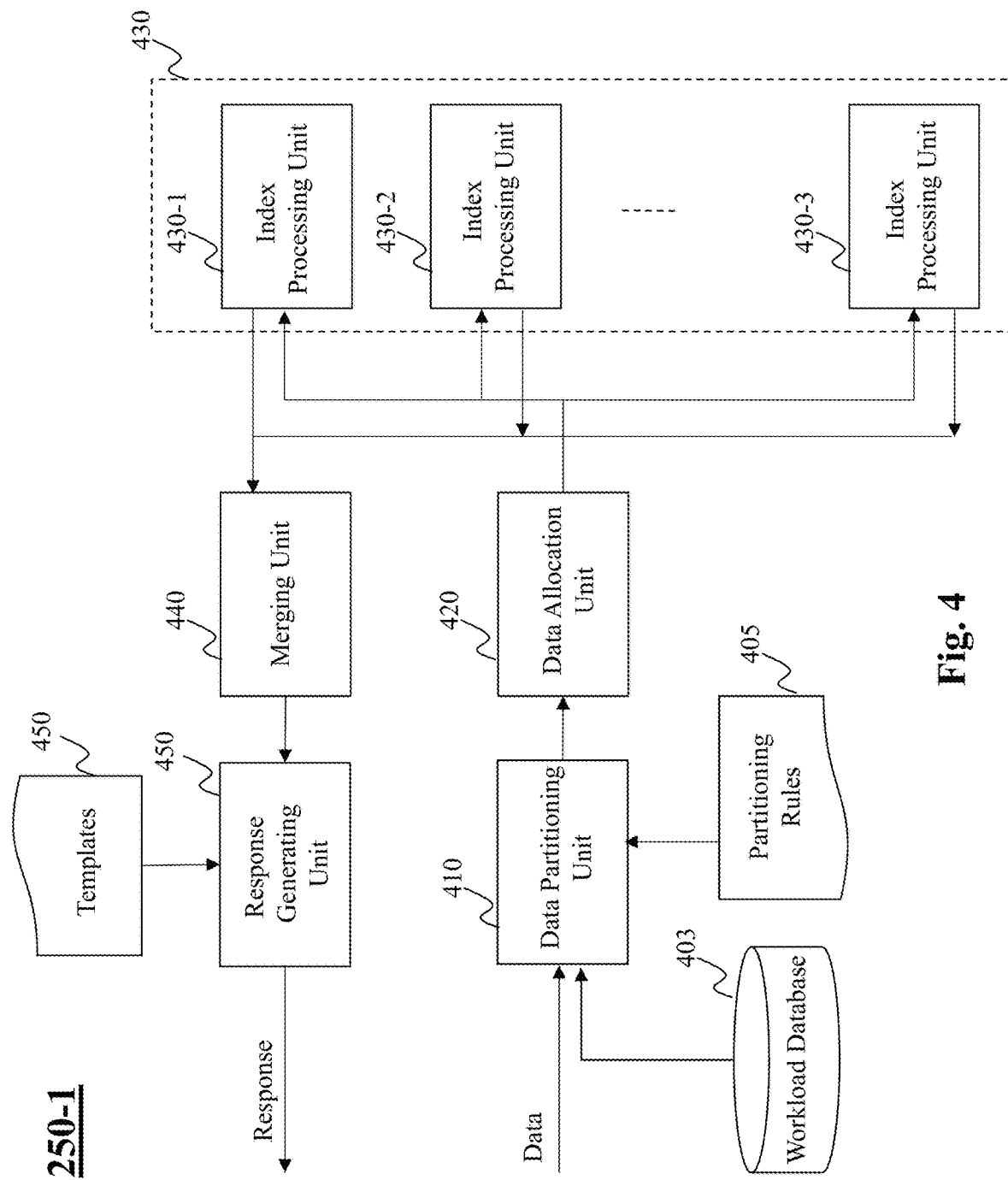
FIG. 4 depicts an exemplary high-level system diagram of an indexing cluster, according to an embodiment of the present teaching.

FIG. 4 depicts an exemplary high-level system diagram of an indexing cluster 250-1, according to an embodiment of the present teaching. It must be appreciated that each indexing cluster of the plurality of indexing clusters 250 has a configuration similar to that as depicted in FIG. 4. The indexing cluster 250-1 includes a data portioning unit 410, a data allocation unit 420, a plurality of index processing units 430-1, 430-2 . . . , 430-3, a merging unit 440, and a response generating unit 450.

The data portioning unit 410 receives data from the data ingestion controllers 270, which in turn retrieve data from the data networks 290 (as shown in FIG. 2). The data partitioning unit 410 utilizes partitioning rules 405 to partition the received data. For example, the data partitioning unit 410 may uniformly partition the received data such that the data allocation unit 420 may allocate equal (or nearly equal) amounts of data to each of the index processing units 430. Alternatively, the data partitioning unit 410 may partition the received data based on a current processing workload of each index processing unit 430-1, 430-2, . . . 430-3. Specifically, a workload database 403 maintains information related to the processing workload of each index processing unit 430-1, 430-2, . . . 430-3. The data partitioning unit 410 may partition (and further allocate via the data allocation unit 420) the received data in a manner such that each index processing unit 430-1, 430-2, . . . 430-3 has a similar workload.

Each of the index processing units 430-1, 430-2, . . . 430-3 processes the received data and indexes the data in a specific manner such that responses to queries may be generated in a fast and efficient manner. Details regarding the index processing units 430 are described next with reference to FIG. 6. The responses (e.g., results obtained via the processing of the individual indexed data of the index processing units 430) generated from each of the index processing units 430-1, 430-2, . . . 430-3 are forwarded to the merging unit 440 that is configured to integrate the individual responses. Further, the response generating unit receives the integrated results from the merging unit 440 and utilizes templates 450 to generate for instance, real-time reports related to the query(s). For example, by one embodiment of the present teaching, the response generating unit 450 may utilize templates such as frequency distribution reports, event related reports, etc. The generated report(s) may be transmitted to the API 210 as shown in FIG. 2 to be presented to the user.

Figure 5:
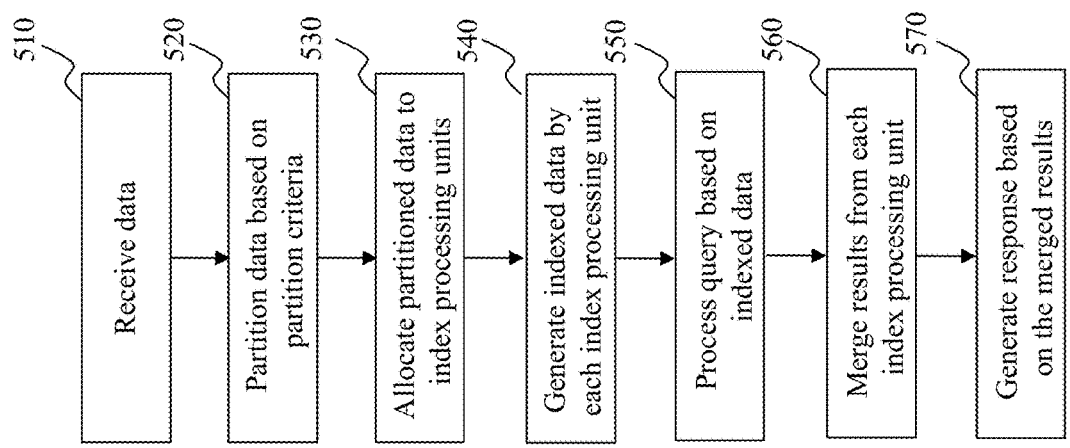
FIG. 5 is a flowchart of an exemplary process of an indexing cluster, according to an embodiment of the present teaching.

FIG. 5 depicts a flowchart of an exemplary process of an indexing cluster, according to an embodiment of the present teaching. The process commences in step 510 wherein the indexing cluster receives data from the data ingestion controllers. In step 520, the received data is partitioned based on partitioning criteria. The process then moves to step 530, wherein the partitioned data is allocated to the index processing units.

In step 540, the index processing units further process the allocated data and index the data in a specific manner that enhances data processing performance of the indexing engine. For instance, by one embodiment of the present teaching, the index processing units compress and store data in a particular format that balances storage usage, data-compression ratio, and reporting performance. Details regarding these features are described next.

The process then proceeds to step 550 wherein each index processing unit processes a query based on its respective indexed data. In step 560, the results of processing the query are merged. In step 570, the indexing cluster generates a report(s) (via utilizing templates) that are further transmitted to an API to eventually be presented to a user.

Figure 6:
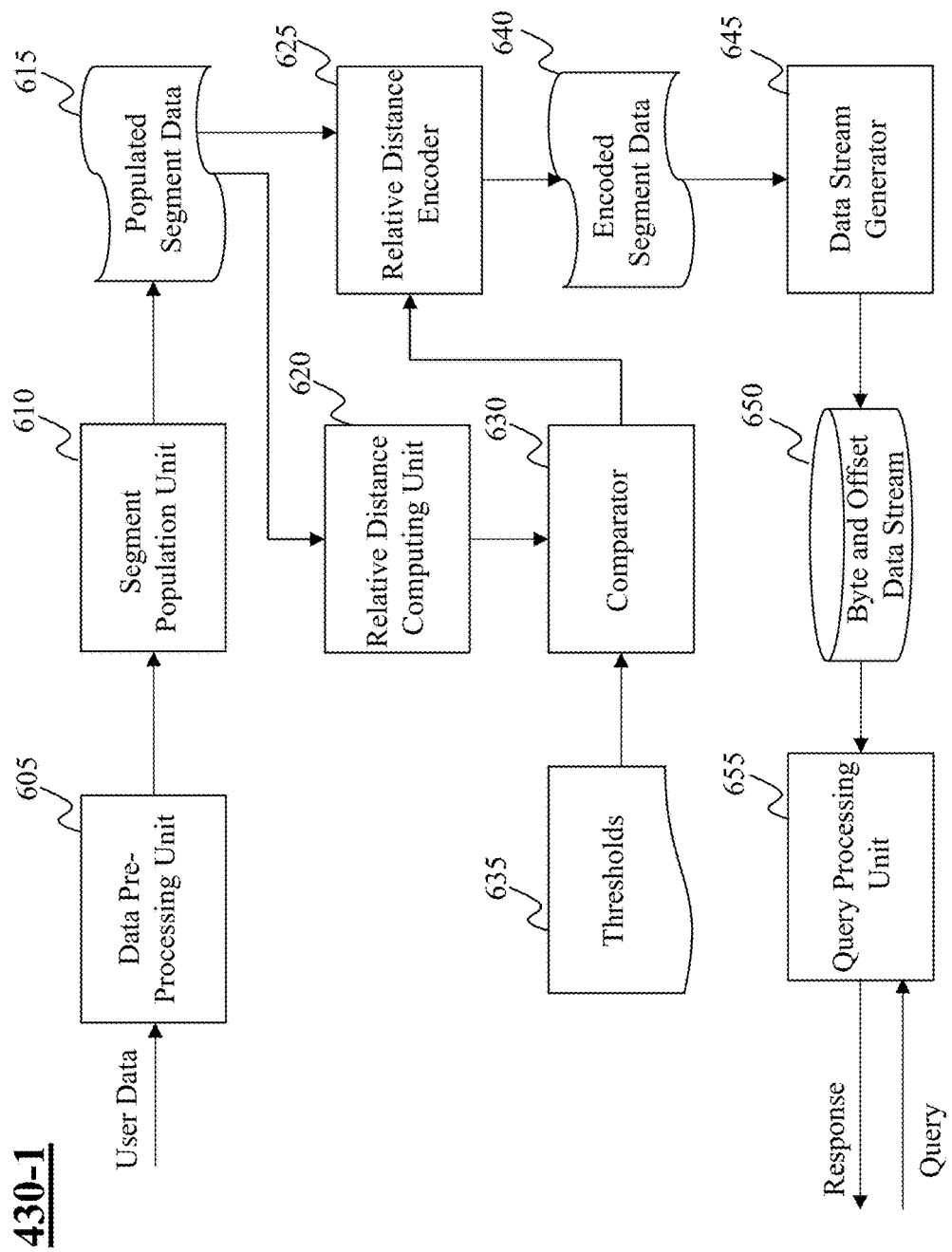
FIG. 6 depicts an exemplary high-level system diagram of an index processing unit, according to an embodiment of the present teaching.

Turning now to FIG. 6, there is depicted an exemplary high-level system diagram of an index processing unit 430-1, according to an embodiment of the present teaching. It must be appreciated that each indexing processing unit included in the indexing cluster (as shown in FIG. 4) has a configuration similar to that as depicted in FIG. 6. By one embodiment, the index processing unit 430-1 is configured to process and index the data in a unique manner. Specifically, the index processing unit 430-1 stores indexed data in a column format. As stated previously, each column may be stored in a separate binary file. Thus, while processing queries, only relevant data (i.e., binary files) may be loaded and processed to generate a response to the query in a fast fashion. The index processing unit 430-1 includes a data preprocessing unit 605, a segment population unit 610, a relative distance computing unit 620, a comparator 630, a relative distance encoder 625, a data stream generator 645, and a query processing unit 655.

Figure 8:
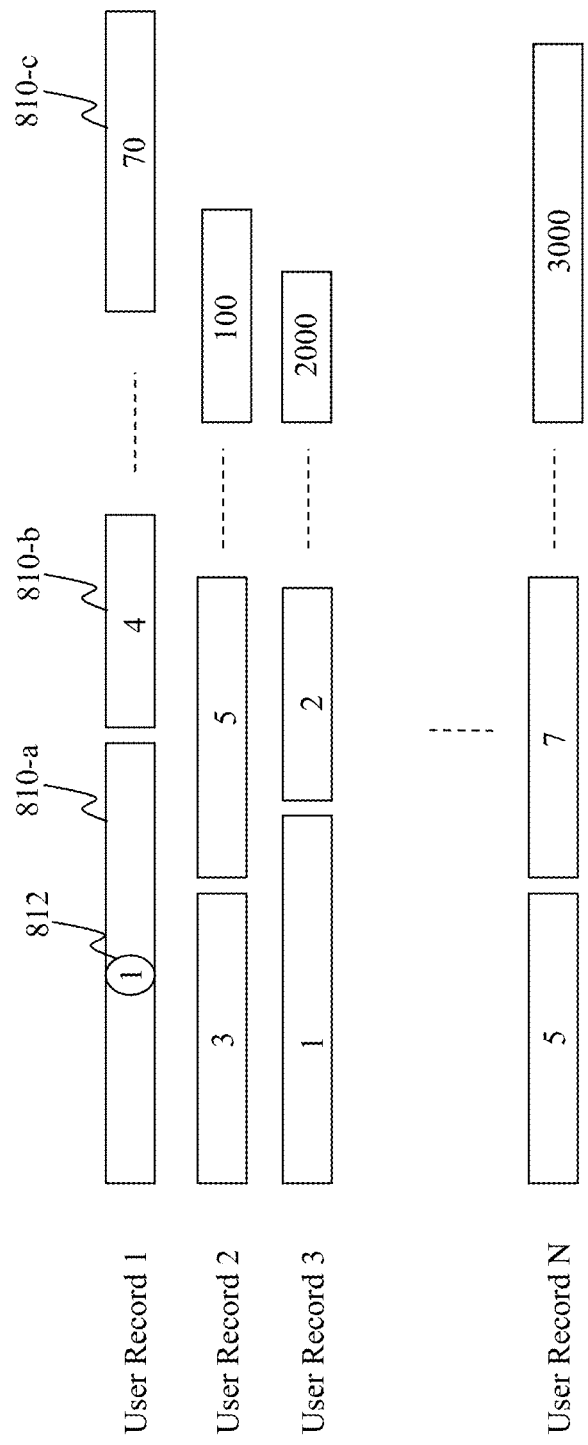
FIG. 8 is a schematic depicting data-segments associated with user records.

The data processing unit 605 receives data and preprocesses the received data. By one embodiment, the received data may be user records as shown in FIG. 8. Each user record is associated with a user identifier (ID) and one or more data-segments 810-*a*, 810-*b* . . . , 810-*c*. Each data-segment is associated with a segment ID 812. Each data-segment may correspond to data related to mail, purchases made by the user, search events related to the user, campaign events, advertisement clicking activities of the user, etc.

Figure 9A:
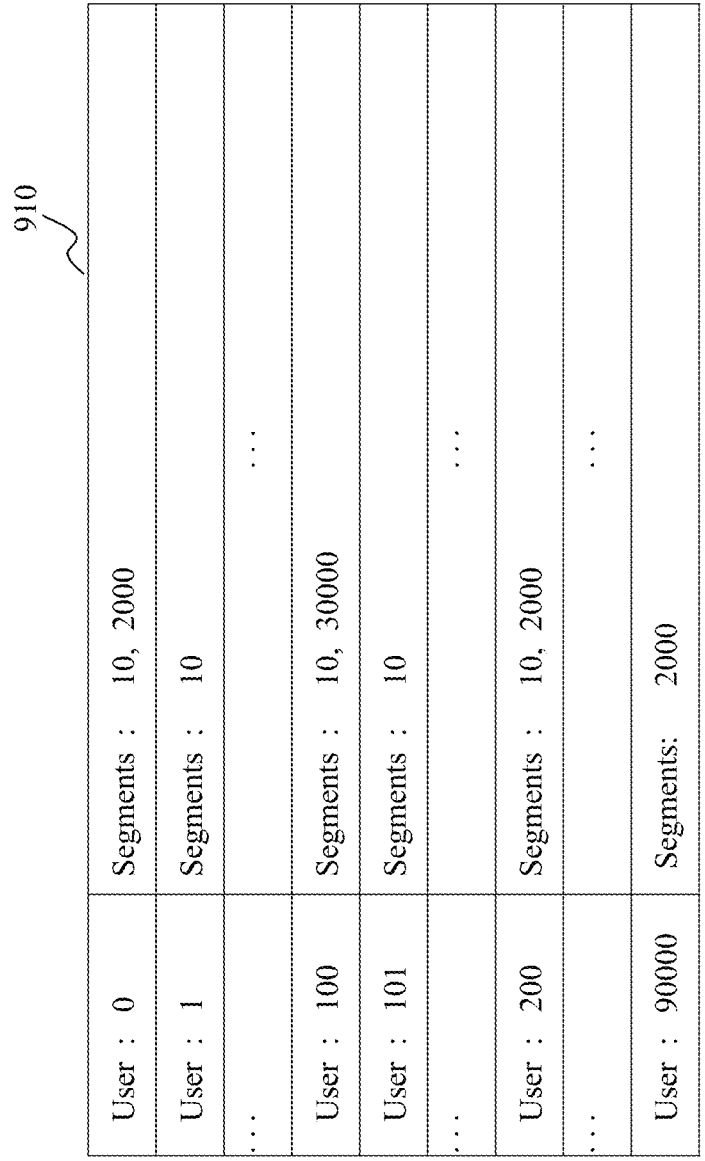
Figure 9B:
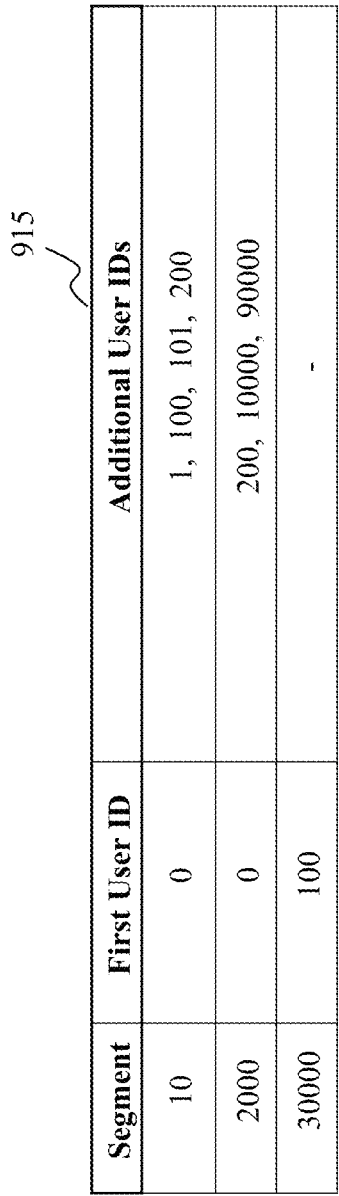

The user records may be pre-processed by the data pre-processing unit 605, for instance, to ensure that information related to the data-segments of the user records e.g., segment IDs and the like, are valid. The pre-processed data is forwarded to the segment population unit 610. The segment population unit 610 is configured to generate segment data 615. By one embodiment of the present teaching, the segment population unit 610 receives as input, pre-processed user records as shown in FIG. 9A. Specifically, FIG. 9A depicts users records and their associated data-segments maintained in a tabular format. The segment population unit 610 generates segment data 615 by performing a transpose operation of the data depicted in FIG. 9A. In other words, the segment population unit 610 identifies for each data-segment, a first user ID and additional user IDs associated with the data-segment. The segment data 615 may be maintained in a tabular format 915 as shown in FIG. 9B.

Figure 9C:
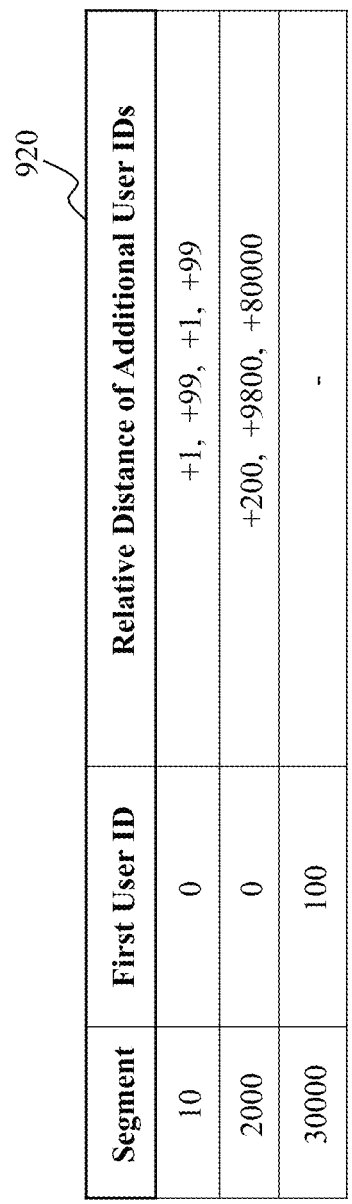

The segment data 615 is forwarded to the relative distance computing unit 620, which is configured to compute for each data-segment, a relative distance of a user ID with respect to a previous user ID that is associated with the data-segment. For instance, referring to FIG. 9B it can be seen that for data-segment having segment ID 10, the users associated with the data segment have user IDs of: 0 (first user ID associated with the data-segment 10), and 1, 100, 101, and 200 (additional user IDs associated with data-segment 10). By one embodiment of the present teaching and as depicted in FIG. 9C, the relative distance computing unit 620 computes the relative distance of the additional user IDs associated with each data-segment. As shown in FIG. 9C, with regard to the data-segment having segment ID 10, the relative distance computing unit 620 computes the relative distances of +1, +99, +1, and +99 for the additional user IDs 1, 100, 101, and 200 that are associated with the data-segment 10. Furthermore, the relative distance computing unit 620 may store the computed relative distances in a tabular format as shown in FIG. 9C.

By one embodiment of the present teaching, the index processing unit 430-1 encodes each computed relative distance based on a criterion associated with a magnitude of the relative distance. Specifically, based on the relative distance being in a first range (i.e., 0-127), the index processing unit encodes the relative distance as the magnitude of relative distance plus a predetermined first number (e.g. 128) into a single byte. For example, as shown in FIG. 9D, for a relative distance (between user IDs) of magnitude 17, the index processing unit encodes the relative distance as: 17+128=145 into binary format represented as '10010001'. Further, based on the relative distance being in a second range (i.e., 128-16383), the index processing unit encodes the relative distance as the magnitude of relative distance plus a predetermined second number (e.g. 32768) into two bytes. For example, as shown in FIG. 9D, for a relative distance (between user IDs) of magnitude 1025, the index processing unit encodes the relative distance as: 1025+32768=33793 into binary format represented as '01000100 00000001'. Similarly, based on the relative distance being in a third range (e.g., greater than 16384), the index processing unit encodes the value of the relative distance into three bytes.

Referring back to FIG. 6, each computed relative distance is forwarded to the comparator 630. The comparator 630 utilizes thresholds 635 to determine a range in which the computed relative distance lies in. Based on the range in which the relative distance lies, an encoding parameter of the relative distance encoder 625 is selected to encode the relative distances as described above. In this manner, the relative distance encoder 625 encodes the relative distances (of the user IDs) for each data-segment to generate encoded segment data 640, which can be maintained in a tabular format 930 as shown in FIG. 9E. Moreover, the user ID of the first user associated with each data-segment is encoded to a fix number of bits (e.g., three bytes). That is the user ID is expressed in a binary format having a fixed length e.g. 24 bits.

Upon completing the encoding of the relative distances of user IDs associated with the data-segments, the data stream generator 645 retrieves the encoded data 640 to generate a byte stream and an offset data stream 650. Specifically, by one embodiment of the present teaching, the data stream generator 645 compiles a single byte stream of user IDs relative distances associated with the data-segments. For example, referring to FIG. 9F, table 950 depicts the byte stream which includes encoded relative distances of user IDs with respect to three data-segments having respective segment IDs denoted as 10, 2000, and 30000. It must be appreciated that the byte stream 950 contains compressed data (i.e., a byte array) containing a variable number of bytes associated with each relative distance of the user ID. In other words, as described before, each relative distance of the user ID may be encoded as one of a single byte, two bytes, and three bytes based on a magnitude of the relative distance.

Figure 9F:
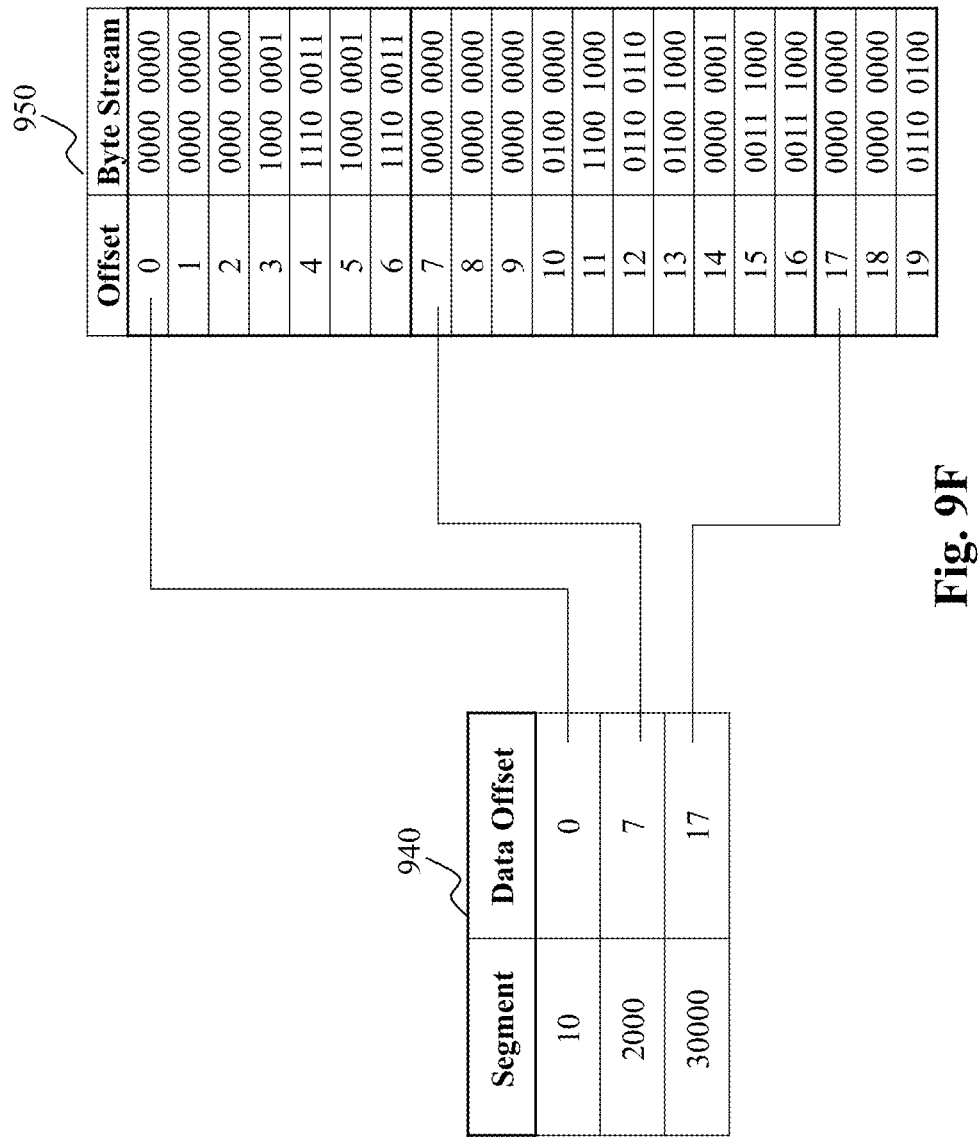

Moreover, the data stream generator 645 also generates an offset stream, which includes information pertaining to offset of user-records associated with the data-segments. Such an offset stream may correspond to header information associated with the byte stream. For example, referring to FIG. 9F, table 940 depicts the offset stream information including an index (i.e., an identifier corresponding to the starting location of the data-segment within the byte stream) for each data-segment. As shown in FIG. 9F, data-segment having a segment ID of 10 has an offset of 0, whereas data-segment having a segment ID of 2000 has an offset of 7. The respective offset values correspond to the index (of the byte stream) where information of a first user identifier associated with the data-segment is stored. Further, the query processing unit 655 receives a query issued by a user. The query processing unit 655 can utilize the byte and offset data streams 650 to generate a response to the query which is eventually provided to the user.

Figure 7:
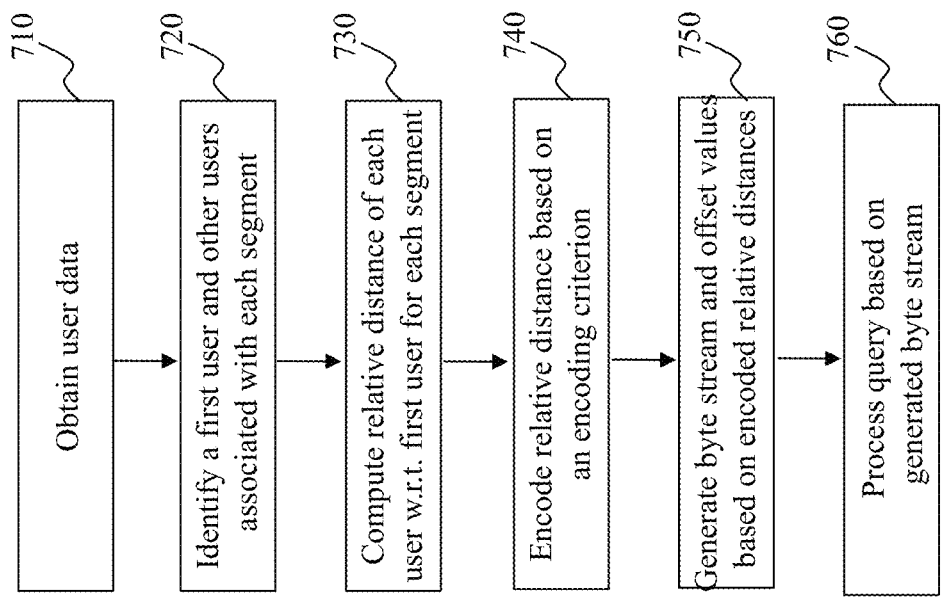
FIG. 7 is a flowchart of an exemplary process of an index processing unit, according to an embodiment of the present teaching.

FIG. 7 depicts a flowchart of an exemplary process of an index processing unit, according to an embodiment of the present teaching. The process commences in step 710, wherein user data (i.e., user records) are obtained. In step 720, the information related to data-segments is generated. Specifically, for each data-segment, the user IDs associated with the data-segment are identified.

In step 730, for each data-segment, a relative distance of each user ID with respect to a previous user ID associated with the data-segment is computed. Further, the process moves to step 740, wherein the computed relative distances are encoded based on an encoding criterion. For example, as stated previously, the relative distance may be encoded based on a range in which the relative distance lies in. Further, in step 750, a byte stream and an offset stream are generated based on the encoded relative distances. Thereafter, in step 760, a response to a query is generated based on the byte stream.

It must be appreciated that the data compression mechanism (i.e., the encoding technique) described herein is effective and optimized for user records. If a data-segment is large (i.e., the data segment is associated with a large number of users) then the average distance between the user IDs is small, and thus only a single byte is required to store the data. For a moderate sized data-segment, the average relative distances may be for example 14 bits long, and thus may fit into two bytes. Moreover, if the data-segment is very small in size (i.e., the data-segment is associated with fewer number of user IDs), then the individual positions may be stored using three bytes of data, which is still considerably smaller than storing the original IDs, which are typically at least 64 bits long. Moreover, performance of generating a response to a query is also enhanced due to the index processing unit as the indexing cluster can access and load only relevant user IDs (from the byte stream) related to any data-segment.

Additionally, in the encoding mechanism as described above, it must be noted that the first two bits of the first encoded byte associated with the user signify a size (number of bytes) used to encode the user ID's relative distance. Specifically, if the first bit is one then the block size (i.e., the number of bytes used to encode the relative distance of the user ID) is one byte, whereas if the second bit is one, then the block size is two bytes, else the block size is 3 bytes.

Accordingly, the data indexing engine of the present disclosure can obtain user IDs related to a segment, as well as obtain data-segments associated with a particular user in a quick and seamless manner. The data indexing engine of the present teaching provides for evaluating complex ad-hoc targeting rules and generating real-time reports based on high-dimensional user data. Moreover, it must be appreciated that the teachings of the present disclosure are in no way limited to the specific implementation as described above. For instance, according to one embodiment of the present teaching, the encoding of the relative distances of the user IDs may be performed in manner (e.g., based on the magnitude of the relative distances) such that the relative distance of a user ID can be encoded into a variable number of bits, as opposed to bytes.

Figure 10:
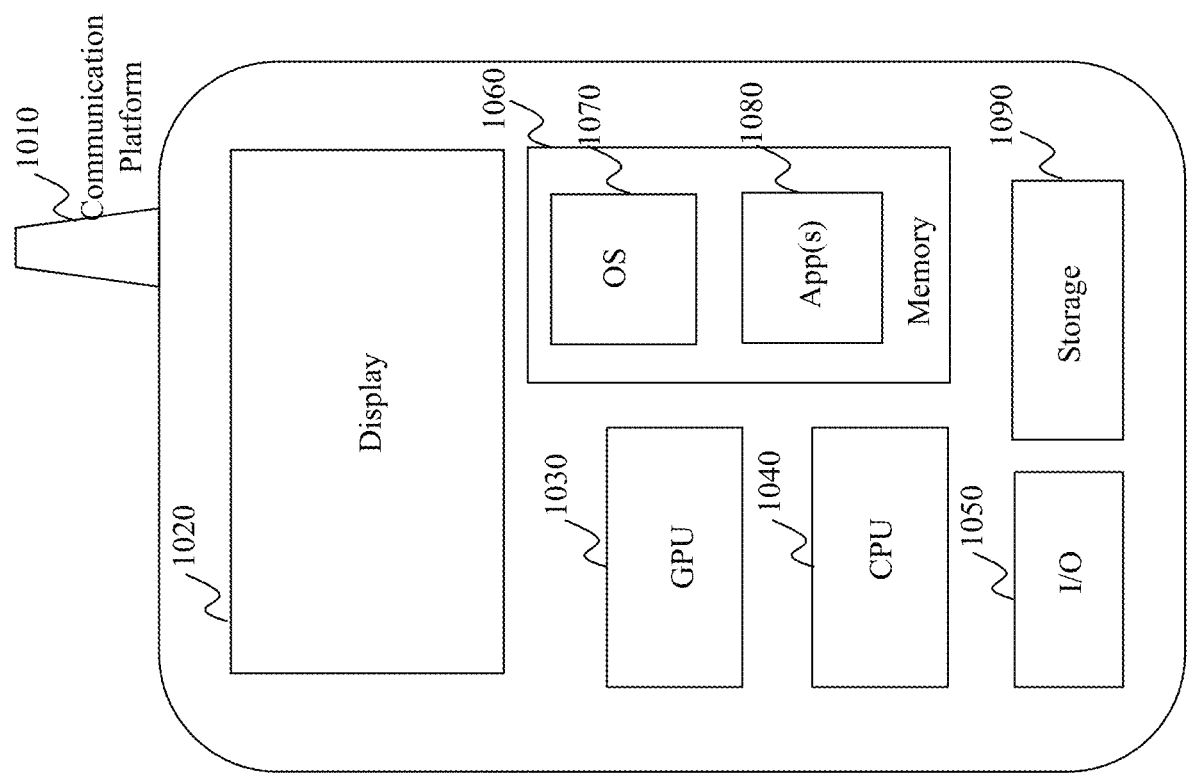
FIG. 10 depicts an architecture of a mobile device which can be used to implement a specialized system incorporating the present teaching.

Turning now to FIG. 10, there is depicted an architecture of a mobile device 1000, which can be used to realize a specialized system implementing the present teaching. In this example, a user device on which the functionalities of the various embodiments described herein can be implemented is a mobile device 1000, including, but not limited to, a smart phone, a tablet, a music player, a handled gaming console, a global positioning system (GPS) receiver, and a wearable computing device (e.g., eyeglasses, wrist watch, etc.), or in any other form factor.

The mobile device 1000 in this example includes one or more central processing units (CPUs) 1040, one or more graphic processing units (GPUs) 1030, a display 1020, a memory 1060, a communication platform 1010, such as a wireless communication module, storage 1090, and one or more input/output (I/O) devices 1050. Any other suitable component, including but not limited to a system bus or a controller (not shown), may also be included in the mobile device 1000. As shown in FIG. 10, a mobile operating system 1070, e.g., iOS, Android, Windows Phone, etc., and one or more applications 1080 may be loaded into the memory 1060 from the storage 1090 in order to be executed by the CPU 1040. The applications 1080 may include a browser or any other suitable mobile apps for performing the various functionalities on the mobile device 1000. User interactions with the content displayed on the display panel 1020 may be achieved via the I/O devices 1050.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

FIG. 11 is an illustrative diagram of an exemplary computer system architecture, in accordance with various embodiments of the present teaching. Such a specialized system incorporating the present teaching has a functional block diagram illustration of a hardware platform which includes user interface elements. Computer 1100 may be a general-purpose computer or a special purpose computer. Both can be used to implement a specialized system for the present teaching. Computer 1100 may be used to implement any component(s) described herein. For example, the present teaching may be implemented on a computer such as computer 1100 via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 1100, for example, may include communication ports 1150 connected to and from a network connected thereto to facilitate data communications. Computer 1100 also includes a central processing unit (CPU) 1120, in the form of one or more processors, for executing program instructions. The exemplary computer platform may also include an internal communication bus 1110, program storage and data storage of different forms (e.g., disk 1170, read only memory (ROM) 1130, or random-access memory (RAM) 1140), for various data files to be processed and/or communicated by computer 1100, as well as possibly program instructions to be executed by CPU 1120. Computer 1100 may also include an I/O component 1160 supporting input/output flows between the computer and other components therein such as user interface elements 1180. Computer 1100 may also receive programming and data via network communications.

Hence, aspects of the present teaching(s) as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the data indexing engine into the hardware platform(s) of a computing environment or other system implementing a computing environment or similar functionalities in connection with indexing content. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the forecasting engine, as disclosed herein, may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on a machine having at least one processor, storage, and a communication platform capable of connecting to a network for indexing user records, the method comprising:

obtaining a plurality of user records, wherein each user record is associated with one of a plurality of user identifiers and one or more of a plurality of data-segments, wherein the plurality of data-segments are variable length arrays;

for each of the plurality of data-segments,
determining a list of user identifiers associated with the data-segment, wherein the user identifiers in the list are sorted, computing a relative distance for each user identifier in the sorted list excluding a first user identifier in the sorted list, wherein the relative distance is a value difference between the user identifier in the sorted list and a previous user identifier that immediately precedes the user identifier in the sorted list, classifying, based on a magnitude of the relative distance, the relative distance of each user identifier into one of a plurality of different value ranges, increasing the relative distance of each user identifier by a value that varies depending on the value range associated with the relative distance, encoding the increased relative distance of each user identifier into a binary form, wherein a length of the binary form varies depending on the value range associated with the relative distance; and generating, based on the encoded relative distances, an offset stream utilized to respond to a query from a user, wherein the offset stream includes offset values for the plurality of data-segments, wherein an offset value of a corresponding data-segment indicates an index of a bit stream where information of a first user identifier associated with the corresponding data-segment is stored, and wherein a report is generated as a response to the query and is presented to the user.

2. The method of claim 1, further comprising determining a number of bits needed to store the encoded relative distance in the bit stream, wherein if the relative distance is classified into a first value range, the number of bits used to store the encoded relative distance is a byte, if the relative distance is classified into a second value range, the number of bits used to store the encoded relative distance is two bytes, and if the relative distance is classified into a third value range, the number of bits used to store the encoded relative distance is three bytes.

3. The method of claim 1, further comprising determining a number of bits needed to store the encoded relative distance in the bit stream, wherein the step of determining the number of bits further comprises:

encoding the relative distance in accordance with a model, wherein an encoding parameter of the model is selected based on the relative distance.

4. The method of claim 3, wherein a first two bits of the encoded relative distance indicates the number of bits used to store the encoded relative distance of the user identifier.

5. The method of claim 1, further comprising:

obtaining the query from the user;

selecting one or more user identifiers from the bit stream that satisfy at least one rule associated with the query; and generating the report to be presented to the user based on the selection.

6. The method of claim 1, wherein information of the first user identifier associated with the data segment corresponds to the first user identifier being expressed in a binary format of length three bytes.

7. The method of claim 1, wherein each of the user identifiers is a corresponding number.

8. A non-transitory computer readable medium including computer executable instructions, wherein the instructions, when executed by a computer, cause the computer to perform a method for indexing user records, the method comprising:

obtaining a plurality of user records, wherein each user record is associated with one of a plurality of user identifiers and one or more of a plurality of data-segments, wherein the plurality of data-segments are variable length arrays;

for each of the plurality of data-segments, determining a list of user identifiers associated with the data-segment, wherein the user identifiers in the list are sorted, computing a relative distance for each user identifier in the sorted list excluding a first user identifier in the sorted list, wherein the relative distance is a value difference between the user identifier in the sorted list and a previous user identifier that immediately precedes the user identifier in the sorted list, classifying, based on a magnitude of the relative distance, the relative distance of each user identifier into one of a plurality of different value ranges, increasing the relative distance of each user identifier by a value that varies depending on the value range associated with the relative distance, encoding the increased relative distance of each user identifier into a binary form, wherein a length of the binary form varies depending on the value range associated with the relative distance; and generating, based on the encoded relative distances, an offset stream utilized to respond to a query from a user, wherein the offset stream includes offset values for the plurality of data-segments, wherein an offset value of a corresponding data-segment indicates an index of a bit stream where information of a first user identifier associated with the corresponding data-segment is stored, and wherein a report is generated as a response to the query and is presented to the user.

9. The medium of claim 8, wherein the method further comprises determining a number of bits needed to store the encoded relative distance in the bit stream, wherein if the relative distance is classified into a first value range, the number of bits used to store the encoded relative distance is a byte, if the relative distance is classified into a second value range, the number of bits used to store the encoded relative distance is two bytes, and if the relative distance is classified into a third value range, the number of bits used to store the encoded relative distance is three bytes.

10. The medium of claim 8, wherein the method further comprises determining a number of bits needed to store the encoded relative distance in the bit stream, and the step of determining the number of bits further comprises:

encoding the relative distance in accordance with a model, wherein an encoding parameter of the model is selected based on the relative distance.

11. The medium of claim 10, wherein a first two bits of the encoded relative distance indicates the number of bits used to store the encoded relative distance of the user identifier.

12. The medium of claim 8, wherein the method further comprises:

obtaining the query from the user;

selecting one or more user identifiers from the bit stream that satisfy at least one rule associated with the query; and generating the report to be presented to the user based on the selection.

13. The medium of claim 8, wherein information of the first user identifier associated with the data segment corresponds to the first user identifier being expressed in a binary format of length three bytes.

14. The medium of claim 8, wherein each of the user identifiers is a corresponding number.

15. A system having at least one processor, storage, and a communication platform capable of connecting to a network for indexing user records, the system comprising:
- a data receiving unit, implemented by the at least one processor, configured for obtaining a plurality of user records, wherein each user record is associated with one of a plurality of user identifiers and one or more of a plurality of data-segments, wherein the plurality of data- segments are variable length arrays;
- a segment population unit, implemented by the at least one processor, configured for determining, for each of the plurality of data-segments, a list of user identifiers associated with the data-segment, wherein the user identifiers in the list are sorted,
- a relative distance computing unit, implemented by the at least one processor, configured for computing, for each data-segment, a relative distance for each user identifier in the sorted list excluding a first user identifier in the sorted list, wherein the relative distance is a value difference between the user identifier in the sorted list and a previous user identifier that immediately precedes the user identifier in the sorted list;
- a relative distance encoder, implemented by the at least one processor, configured for:
  - classifying, for each data-segment, based on a magnitude of the relative distance, the relative distance of each user identifier into one of a plurality of different value ranges,
  - increasing the relative distance of each user identifier by a value that varies depending on the value range associated with the relative distance, and
  - encoding the increased relative distance of each user identifier into a binary form, wherein a length of the binary form varies depending on the value range associated with the relative distance; and
- a data stream generator, implemented by the at least one processor, configured for generating, based on the encoded relative distances, an offset stream utilized to respond to a query from a user, wherein the offset stream includes offset values for the plurality of data-segments, wherein an offset value of a corresponding data-segment indicates an index of a bit stream where information of a first user identifier associated with the corresponding data-segment is stored, and wherein a report is generated as a response to the query and is presented to the user.

16. The system of claim 15, wherein the relative distance encoder is further configured for determining a number of bits needed to store the encoded relative distance in the bit stream, and wherein
- if the relative distance is classified into a first value range, the number of bits used to store the encoded relative distance is a byte,
- if the relative distance is classified into a second value range, the number of bits used to store the encoded relative distance is two bytes, and
- if the relative distance is classified into a third value range, the number of bits used to store the encoded relative distance is three bytes.

17. The system of claim 15, wherein the relative distance encoder is further configured for:
- encoding the relative distance in accordance with a model, wherein an encoding parameter of the model is selected based on the relative distance.

18. The system of claim 17, wherein a first two bits of the encoded relative distance indicates the number of bits used to store the encoded relative distance of the user identifier.

19. The system of claim 15, further comprising a query processing unit, implemented by the at least one processor, configured for:
- obtaining the query from the user;
- selecting one or more user identifiers from the bit stream that satisfy at least one rule associated with the query; and
- generating the report to be presented to the user based on the selection.

20. The system of claim 15, wherein each of the user identifiers is a corresponding number.

* * * * *